United States Patent
Bai et al.

(10) Patent No.: US 12,212,516 B2
(45) Date of Patent: Jan. 28, 2025

(54) REDUCED ACTIVATION TIME FOR TRANSMISSION CONFIGURATION INDICATOR STATE

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 17/812,008

(22) Filed: Jul. 12, 2022

(65) Prior Publication Data

US 2023/0045317 A1    Feb. 9, 2023

Related U.S. Application Data

(60) Provisional application No. 63/203,972, filed on Aug. 5, 2021.

(51) Int. Cl.
*H04L 5/00* (2006.01)

(52) U.S. Cl.
CPC .......... *H04L 5/0048* (2013.01); *H04L 5/0096* (2013.01)

(58) Field of Classification Search
CPC ... H04L 5/0048; H04L 5/0096; H04B 7/0628; H04B 7/0664; H04B 7/0668; H04B 7/088
See application file for complete search history.

(56) References Cited

U.S. PATENT DOCUMENTS

| | | | |
|---|---|---|---|
| 7,039,123 B2 * | 5/2006 | Kokuryo | H03D 3/007 |
| | | | 375/295 |
| 2020/0221485 A1 * | 7/2020 | Cirik | H04L 5/0051 |
| 2020/0245333 A1 * | 7/2020 | Lin | H04L 1/0026 |
| 2021/0111851 A1 * | 4/2021 | Lin | H04W 24/10 |

* cited by examiner

*Primary Examiner* — Jamal Javaid
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may identify a set of reference signals (RSs) that are associated with a reduced activation time. The UE may receive activation signaling identifying a transmission configuration indicator (TCI) state associated with an RS, of the set of RSs, to be activated for a communication. The UE may perform the communication using the identified TCI state, wherein the identified TCI state is activated within the reduced activation time after the activation signaling is received. Numerous other aspects are described.

28 Claims, 9 Drawing Sheets

REDUCED ACTIVATION TIME FOR TRANSMISSION CONFIGURATION INDICATOR STATE

CROSS-REFERENCE TO RELATED APPLICATION

This Patent Applications claims priority to U.S. Provisional Patent Application No. 63/203,972, filed on Aug. 5, 2021, entitled "REDUCED ACTIVATION TIME FOR TRANSMISSION CONFIGURATION INDICATOR STATE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a low latency beam update.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include identifying a set of reference signals (RSs) that are associated with a reduced activation time. The method may include receiving activation signaling identifying a transmission configuration indicator (TCI) state associated with an RS, of the set of RSs, to be activated for a communication. The method may include performing the communication using the identified TCI state, wherein the identified TCI state is activated within the reduced activation time after the activation signaling is received.

Some aspects described herein relate to a method of wireless communication performed by a base station. The method may include identifying a set of RSs that are associated with a reduced activation time at a UE. The method may include transmitting activation signaling identifying a TCI state associated with an RS, of the set of RSs, to be activated for a communication. The method may include performing the communication using the identified TCI state, wherein the identified TCI state is activated within the reduced activation time after the activation signaling is received by the UE.

Some aspects described herein relate to an apparatus for wireless communication at a UE. The apparatus may include a memory. The apparatus may include one or more processors, coupled to the memory, configured to identify a set of RSs that are associated with a reduced activation time; receive activation signaling identifying a TCI state associated with an RS, of the set of RSs, to be activated for a communication; and perform the communication using the identified TCI state, where the identified TCI state is activated within the reduced activation time after the activation signaling is received.

Some aspects described herein relate to an apparatus for wireless communication at a base station. The apparatus may include a memory. The apparatus may include one or more processors, coupled to the memory, configured to identify a set of RSs that are associated with a reduced activation time at a UE; transmit activation signaling identifying a TCI state associated with an RS, of the set of RSs, to be activated for a communication; and perform the communication using the identified TCI state, where the identified TCI state is activated within the reduced activation time after the activation signaling is received by the UE.

Some aspects described herein relate to a non-transitory computer-readable medium that stores a set of instructions for wireless communication by a UE. The set of instructions, when executed by one or more processors of the UE, may cause the UE to identify a set of RSs that are associated with a reduced activation time. The set of instructions, when executed by one or more processors of the UE, may cause the UE to receive activation signaling identifying a TCI state associated with an RS, of the set of RSs, to be activated for a communication. The set of instructions, when executed by one or more processors of the UE, may cause the UE to perform the communication using the identified TCI state, wherein the identified TCI state is activated within the reduced activation time after the activation signaling is received.

Some aspects described herein relate to a non-transitory computer-readable medium that stores a set of instructions for wireless communication by a base station. The set of instructions, when executed by one or more processors of the base station, may cause the base station to identify a set of RSs that are associated with a reduced activation time at a UE. The set of instructions, when executed by one or more processors of the base station, may cause the base station to transmit activation signaling identifying a TCI state associated with an RS, of the set of RSs, to be activated for a communication. The set of instructions, when executed by one or more processors of the base station, may cause the base station to perform the communication using the identified TCI state, wherein the identified TCI state is activated within the reduced activation time after the activation signaling is received by the UE.

Some aspects described herein relate to an apparatus for wireless communication. The apparatus may include means for identifying a set of RSs that are associated with a reduced activation time. The apparatus may include means for receiving activation signaling identifying a TCI state associated with an RS, of the set of RSs, to be activated for a communication. The apparatus may include means for performing the communication using the identified TCI state, wherein the identified TCI state is activated within the reduced activation time after the activation signaling is received.

Some aspects described herein relate to an apparatus for wireless communication. The apparatus may include means for identifying a set of RSs that are associated with a reduced activation time at a UE. The apparatus may include means for transmitting activation signaling identifying a TCI state associated with an RS, of the set of RSs, to be activated for a communication. The apparatus may include means for performing the communication using the identified TCI state, wherein the identified TCI state is activated within the reduced activation time after the activation signaling is received by the UE.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
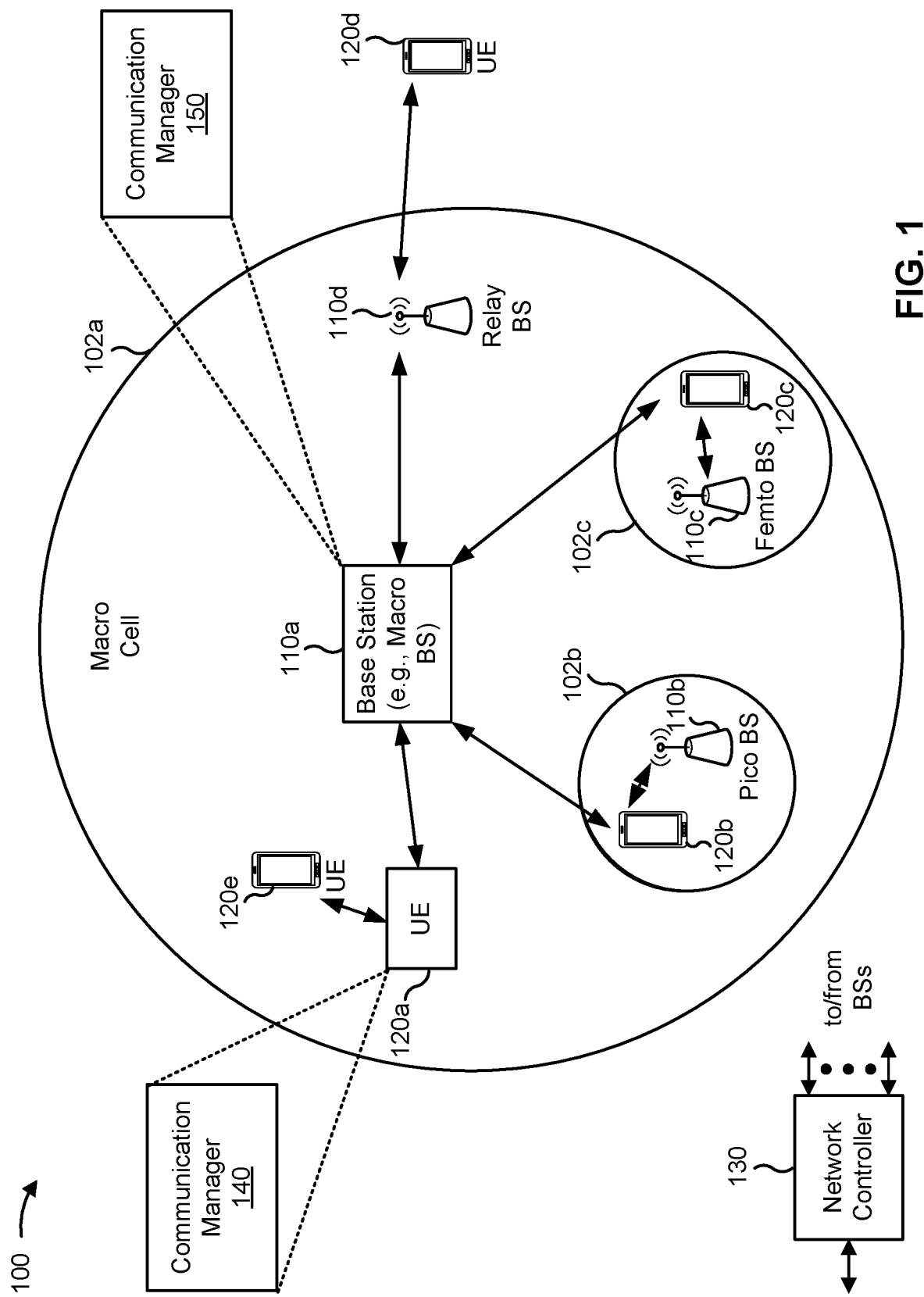
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify a set of reference signals (RSs) that are associated with a reduced activation time; receive activation signaling identifying a TCI state associated with an RS, of the set of RSs, to be activated for a communication; and perform the communication using the identified TCI state, wherein the identified TCI state is activated within the reduced activation time after the activation signaling is received. Additionally, or alternatively, the communication manager 140 may perform one or more other operations described herein.

In some aspects, the base station 110 may include a communication manager 150. As described in more detail elsewhere herein, the communication manager 150 may identify a set of RSs that are associated with a reduced activation time at a UE; transmit activation signaling identifying a TCI state associated with an RS, of the set of RSs, to be activated for a communication; and perform the communication using the identified TCI state, wherein the identified TCI state is activated within the reduced activation time after the activation signaling is received by the UE. Additionally, or alternatively, the communication manager 150 may perform one or more other operations described herein.

As indicated above, FIG. 1 is provided as an example. Other examples may differ from what is described with regard to FIG. 1.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more central units (CUs), one or more distributed units (DUs), one or more radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 2:
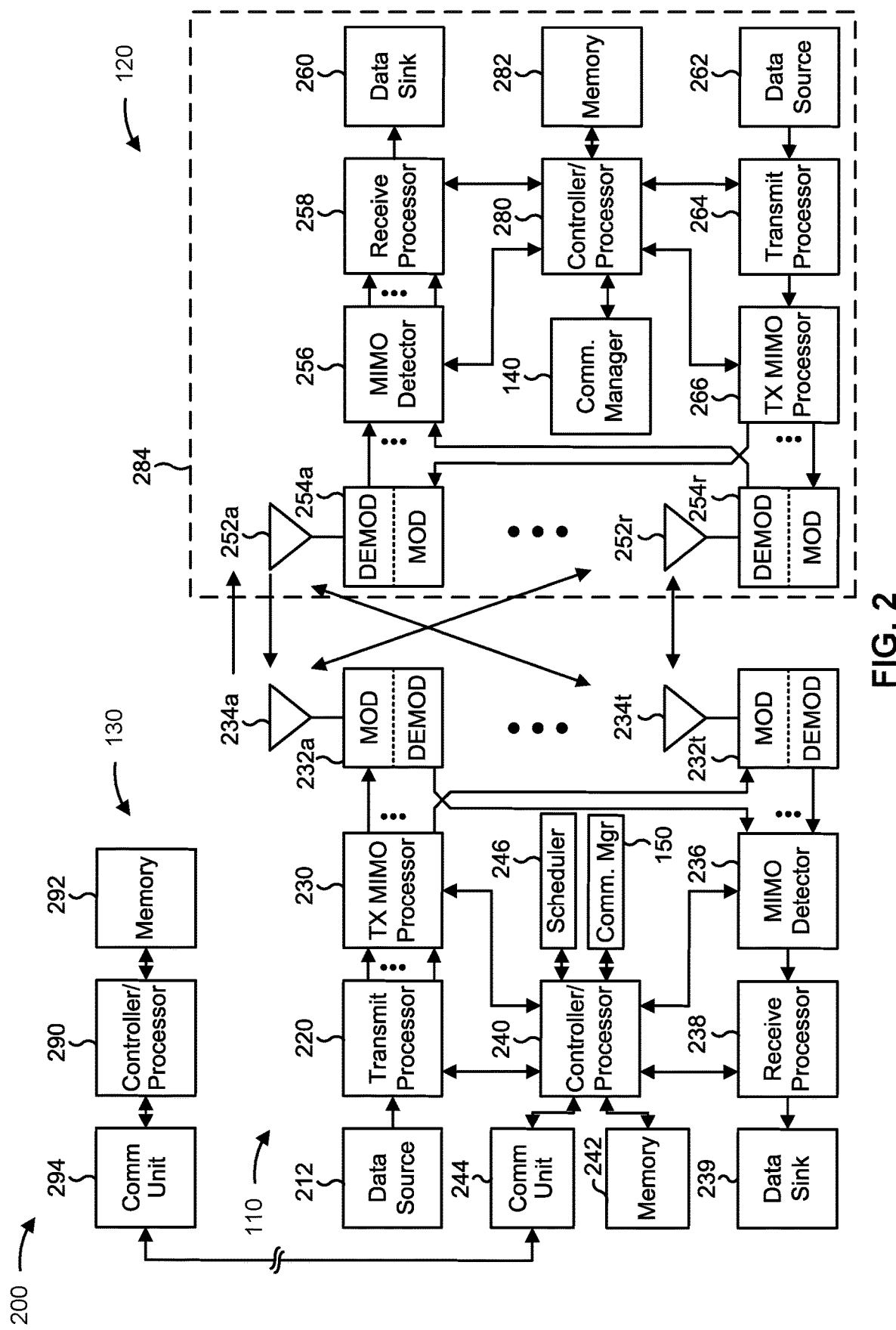
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with low latency beam update, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for identifying a set of RSs that are associated with a reduced activation time; means for receiving activation signaling identifying a TCI state associated with an RS, of the set of RSs, to be activated for a communication; and/or means for performing the communication using the identified TCI state, wherein the identified TCI state is activated within the reduced activation time after the activation signaling is received. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for identifying a set of RSs that are associated with a reduced activation time at a UE; means for transmitting activation signaling identifying a TCI state associated with an RS, of the set of RSs, to be activated for a communication; and/or means for performing the communication using the identified TCI state, wherein the identified TCI state is activated within the reduced activation time after the activation signaling is received by the UE. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Wireless communication devices, such as UEs and network nodes (e.g., base stations), may communicate with each other using beamforming. A transmitting wireless communication device may generate a transmit beam to transmit a signal, such as by applying a spatial filter to a set of antennas. A receiving wireless communication device may generate a receive beam to receive the signal, such as by applying a spatial filter to a set of antennas.

The beams used for beamformed communication may require updating such that the transmitting wireless communication device's transmit beam is aligned with the receiving wireless communication device's receive beam. A RAT such as 5G/NR may provide a mechanism for indication of which beam to use to receive a particular communication. For example, 5G/NR may provide for the signaling of information identifying a beam for a communication. In some aspects, this information may take the form of a transmission configuration indicator (TCI) state.

A TCI state (sometimes referred to as "a TCI," where a TCI can include one or more parameters of one or more TCI states) may indicate a set of parameters (referred to as quasi co-location (QCL) parameters, where a set of QCL parameters are identified by a QCL type) and a source RS from which the set of parameters are to be derived. For example, a TCI state may indicate that an antenna port used for a RS (such as a synchronization signal block (SSB) or a channel state information RS (CSI-RS)) is quasi co-located with an antenna port used for a corresponding communication. Thus, a receiving wireless communication device that receives the RS can infer the parameters for the corresponding communication. A QCL parameter may be referred to as a QCL property.

QCL types include QCL-TypeA, which includes QCL parameters of a Doppler shift, a Doppler spread, an average delay, and a delay spread; QCL-TypeB, which includes QCL parameters of a Doppler shift and a Doppler spread; QCL-TypeC, which includes QCL parameters of an average delay and a Doppler shift; and QCL-TypeD, which includes a QCL parameter of a spatial receive parameter.

TCI states may be configured, activated, and selected using a combination of radio resource control (RRC) signaling, medium access control (MAC) signaling, and/or downlink control information (DCI). For example, a base station may transmit RRC signaling identifying a plurality of TCI states (in some aspects, up to 128 TCI states for a physical downlink shared channel (PDSCH) and up to 64 TCI states for a physical downlink control channel (PDCCH)). Each TCI state may identify a relevant cell and bandwidth part. After configuration, all TCI states are deactivated by default. For a PDSCH, the base station may transmit MAC signaling activating a subset of the configured TCI states. A TCI state that is activated is available for selection to be used for a particular communication. The base station may transmit DCI indicating a TCI state to be used for a particular PDSCH resource allocation. The UE can then use the QCL parameters from the relevant TCI state to decode the PDSCH. For a PDCCH, the base station may transmit a MAC control element (MAC-CE) activating a single TCI state for a particular control resource set. The UE can then use the QCL parameters from the single TCI state to decode a PDCCH received in a search space associated with the control resource set.

The activation of TCI states using MAC signaling may be associated with an activation time. The activation time is a length of time measured from when a MAC-CE indicating a TCI state for a beam update (referred to herein as activation signaling) is received to when the UE is to have activated the TCI state. The length of the activation time may be a function of whether the TCI state is "known" to the UE. A TCI state is "known" to the UE if the following conditions are met during the period from the last transmission of the RS resource used for the Layer 1 reference signal received power (L1-RSRP) measurement reporting for the target TCI state to the completion of active TCI state switch, where the RS resource for L1-RSRP measurement is the RS in target TCI state or QCLed to the target TCI state:

The TCI state switch command (that is, activation signalling) is received within 1280 ms upon the last transmission of the RS resource for beam reporting or measurement;
  The UE has sent at least 1 L1-RSRP report for the target TCI state before the TCI state switch command;
  The TCI state remains detectable during the TCI state switching period;
  The SSB associated with the TCI state remain detectable during the TCI switching period; and
  Signal to noise ratio (SNR) of the TCI state≥−3 dB.

Figure 3:
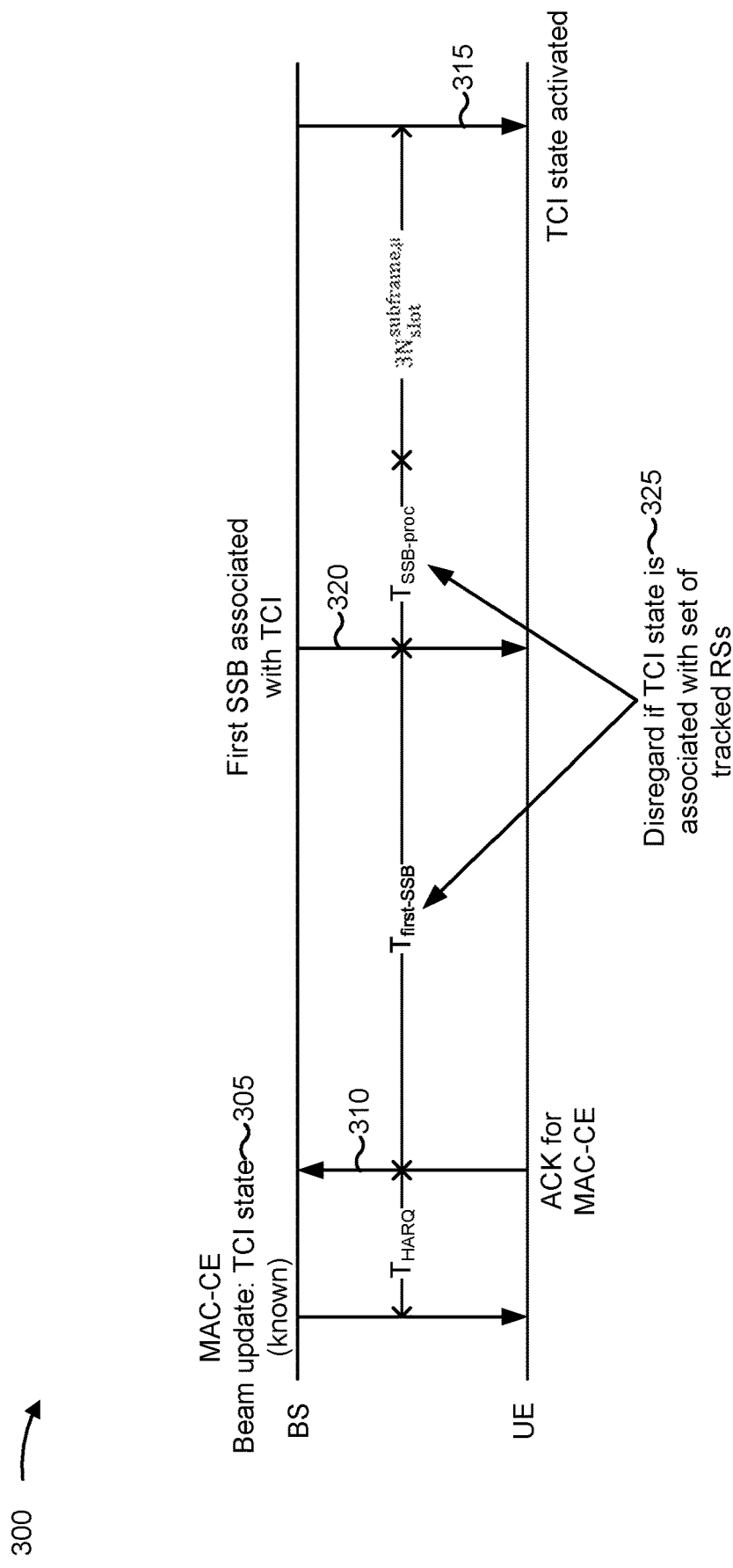
FIG. 3 is a diagram illustrating an example of activating a transmission configuration indicator (TCI) state in accordance with an activation time, in accordance with the present disclosure.

FIG. 3 is a diagram illustrating an example 300 of activating a TCI state in accordance with an activation time, in accordance with the present disclosure. Example 300 includes a UE (e.g., UE 120) and a BS (e.g., BS 110). Downlink transmissions are indicated by downward arrows and uplink transmissions are indicated by upward arrows.

As shown in FIG. 3, and by reference number 305, the BS may transmit, and the UE may receive, activation signaling (that is, a MAC-CE beam update, sometimes referred to as a MAC-CE activation command), such as via a PDSCH. The activation signaling may indicate a TCI state to be activated by the UE. For example, the TCI state may be one of a plurality of configured TCI states (not shown in FIG. 3). As further shown, in this example, the TCI state is known to the UE. For example, the TCI state may satisfy the conditions to be considered as a known TCI state. The TCI state may be one of a set of TCI states activated as selectable for a PDSCH, or the TCI state may be a TCI state activated for a PDCCH (e.g., for a control resource set).

As shown by reference number 310, the UE may transmit an acknowledgment for the activation signaling after a time interval shown as $T_{HARQ}$. For example, the UE may transmit hybrid automatic repeat request (HARD) feedback after the time interval.

The UE may activate the TCI state (e.g., may be mandated to activate the TCI state) by a time shown by reference number 315. This time is referred to herein as an activation time. The activation time may be based at least in part on whether the TCI state is known to the UE. If the TCI state is known to the UE, then the TCI state may be activated after slot $n+T_{HARQ}+3N_{slot}^{subframe,\mu}+TO_k*(T_{first-SSB}+T_{SSB-proc})/$ NR slot length, where $T_{HARQ}$ is the timing between downlink data transmission and acknowledgement, $3N_{slot}^{subframe,\mu}$ is a delay to apply the TCI state as defined by a wireless communication specification (e.g., 3 ms), $T_{first-SSB}$ is a time to the first SSB transmission after the MAC-CE is decoded by the UE (where the SSB is QCL-TypeA or QCL-TypeC to the target TCI state), $T_{SSB-proc}=2$ ms, and $TO_k=1$ if target TCI state is not in the active TCI state list for PDSCH and 0 otherwise. The first SSB transmission is shown by reference number 320, and the MAC-CE, as described above, is shown by reference number 305.

The usage of the activation time may introduce some latency in MAC based beam updating. For example, the SSB can have a periodicity of up to 20 ms. Therefore, the term $T_{first-SSB}$ can be the dominating term in the determination of the activation time. For example, if the MAC-CE arrives immediately after an associated SSB, the UE may have to wait for another 20 ms, even if the UE has measured the associated SSB before the MAC-CE's arrival. Furthermore, there are situations where the base station may not know exactly which reference signals are being monitored by the UE. For example, a base station may not know whether a UE has measured a CSI-RS or an SSB (if reporting) is not triggered by the measurement of the CSI-RS or the SSB. As another example, in a discontinuous reception cycle, the UE may not be required to measure some reference signals outside of an active time (e.g., on duration). As still another example, a P3 stage of beam management (e.g., CSI-RS beam/UE receive beam refinement sweeping) and a tracking reference signal (TRS) measurement procedure generally do not require reporting after beam management. This uncertainty regarding which reference signals are measured by the UE may introduce uncertainty in how the activation time should be determined. Uncertainty in how the activation time is determined may lead to latency in TCI state activation, delays in communication between the base station and the UE, and decreased throughput.

Some techniques and apparatuses described herein provide reduction of the activation time for MAC based TCI state activation. For example, as shown by reference number 325, the UE may use a reduced activation time if the activated TCI state is associated with a set of RSs sometimes referred to herein as a set of tracked RSs. The set of tracked RSs may be a set of RSs that the UE monitors, such as a set of RSs for which the UE performs time and frequency (time/frequency) tracking. Since the UE performs time/frequency tracking of the set of tracked RSs, the UE can proceed to activate a TCI state corresponding to one of the set of tracked RSs without waiting for the first SSB associated with the TCI state (shown by reference number 320). Thus, the activation time can be shortened by at least $T_{first-SSB}$ (e.g., the UE may ignore the time until the next SSB is received as represented by $T_{first-SSB}$). In one example, the shortened activation time may use $TO_k=0$, thereby shortening the activation time by $(T_{first-SSB}+T_{SSB-proc})$ NR slot length relative to the baseline activation time for a known TCI state. In some aspects, information identifying the set of tracked RSs is signaled to the UE by the base station, as described in connection with FIG. 4. In some other aspects, the UE may determine the set of tracked RSs and may signal information identifying the set of tracked RSs to the base station, as described in connection with FIG. 5.

By reducing the activation time for MAC based TCI state activation, latency is reduced, and throughput is improved. Signaling information identifying the set of RSs to the UE may enable the base station to specify particular RSs to track, which simplifies operation of the base station. Signaling information identifying the set of tracked RSs to the base station may reduce ambiguity regarding which RSs are tracked by the UE, which improves the accuracy of determination of the activation time, reduces latency, and increases throughput.

As indicated above, FIG. 3 is provided as an example. Other examples may differ from what is described with regard to FIG. 3.

Figure 4:
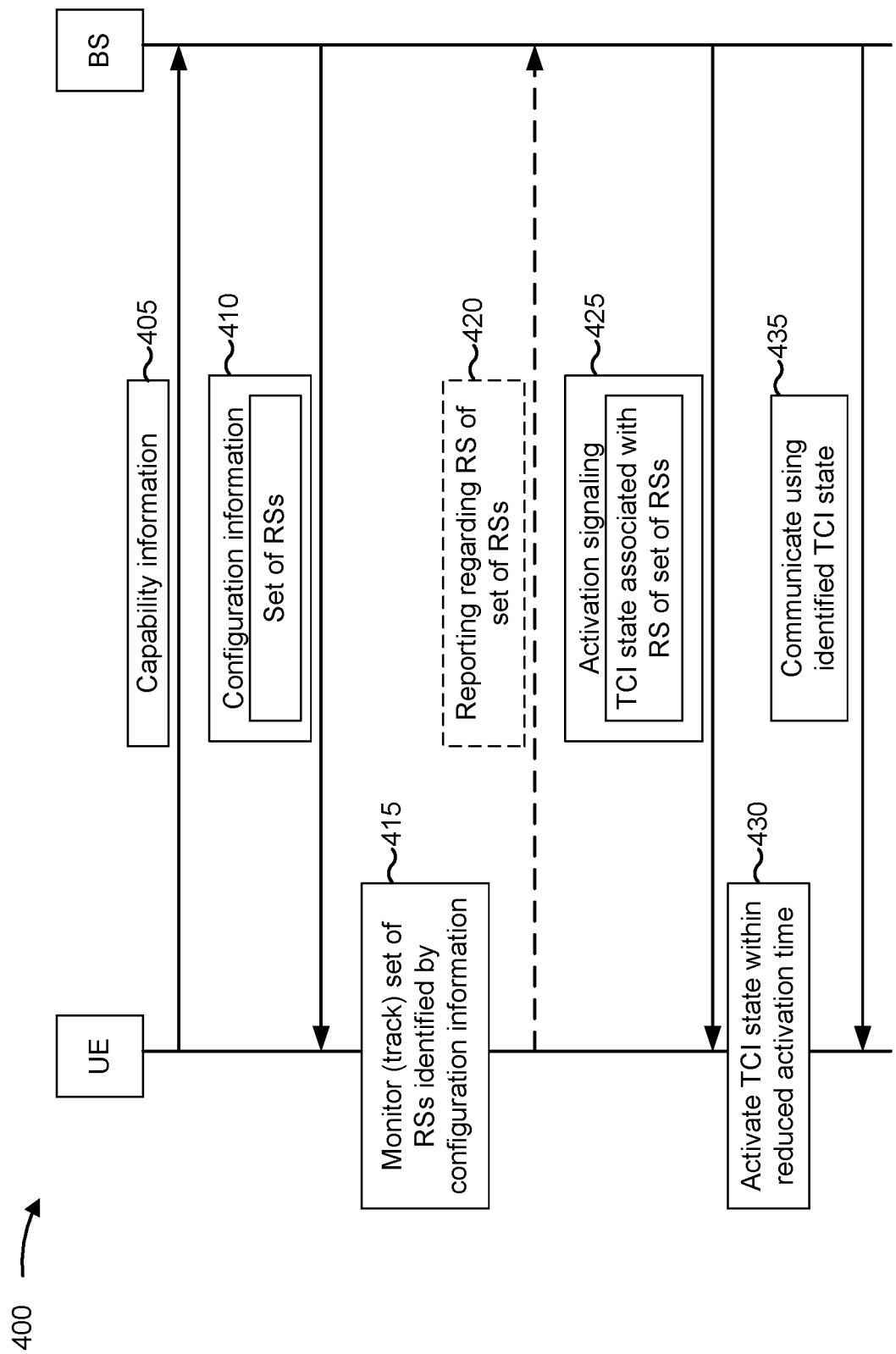
FIGS. 4-5 are diagrams illustrating examples associated with activating a TCI state in accordance with a reduced activation time, in accordance with the present disclosure.

FIG. 4 is a diagram illustrating an example 400 associated with activating a TCI state in accordance with a reduced activation time, in accordance with the present disclosure. As shown, example 400 includes a UE 120 and a BS 110. In example 400, configuration information indicating the set of RSs is signaled to the UE 120 by the BS 110. In some aspects, the BS 110 may include or be associated with one or more network nodes of a disaggregated base station. For example, the BS 110 may include a radio unit (RU), which may perform radio communications with the UE 120. In some aspects, the BS 110 may transmit or receive communications based on interactions with another network node, such as a distributed unit (DU) or a central unit (CU).

As shown by reference number 405, the UE 120 may transmit, and the BS 110 may receive, capability information. The capability information may indicate one or more capabilities of the UE 120. In some aspects, the capability information may indicate whether the UE 120 supports the usage of the set of tracked RSs for MAC based beam updating. In some aspects, the capability information may indicate a maximum number of RSs that the UE 120 can support in a set of tracked RSs (e.g., a number of RSs that can be included in the set of RSs). In some aspects, the UE 120 may transmit the capability information via RRC signaling.

As shown by reference number 410, the BS 110 may transmit configuration information (e.g., to the UE 120). In some aspects, the BS 110 may receive the configuration information from another network node, such as a CU, prior to transmitting the configuration information. For example, the BS 110 may transmit the configuration information via RRC signaling, MAC signaling, DCI, or a combination thereof. As shown, the configuration information may indicate a set of RSs (sometimes referred to herein as a set of tracked RSs). For example, the configuration information may indicate a set of RS indexes (e.g., SSB indexes or CSI-RS indexes) identifying the set of RSs. In some aspects, the set of RSs may be based at least in part on the capability information. For example, the set of RSs may include at most the maximum number of RSs supported by the UE 120, or the set of RSs may be configured based at least in part on the UE 120 supporting the set of RSs. In some aspects, the configuration information may configure a plurality of RSs and may identify the set of RSs from the plurality of RSs. In some aspects, a network node other than the BS 110 (e.g., a CU or a DU) may transmit the configuration information. In some aspects, the network node may configure the BS 110 and/or a DU associated with the BS 110 based at least in part on the configuration information, such that information associated with the set of RSs is configured at both the UE 120 and the BS 110 or the DU.

In some aspects, the configuration information may include information associated with the set of RSs. For example, the configuration information may identify time synchronization information (e.g., information indicating a time associated with the set of RSs so that the UE 120 can track the set of RSs in time), frequency synchronization information (e.g., information indicating a frequency associated with the set of RSs so that the UE 120 can track the set of RSs in frequency), power delay profile information (e.g., information indicating a delay spread corresponding to a channel of an RS of the set of RSs), spatial filter information (e.g., information indicating a filter to receive a beam that carries an RS of the set of RSs), or the like. The set of RSs may include, for example, one or more SSBs, one or more semi-persistent CSI-RSs, one or more periodic CSI-RSs, or the like.

In some aspects, the configuration information may indicate that the set of RSs belong to a new beam identification (NBI) RS set associated with time/frequency tracking. In some aspects, the configuration information may indicate that the set of RSs belong to a beam failure determination (BFD) RS set associated with time/frequency tracking. That is, the set of RSs may be defined as a set of RSs belonging to an NBI RS set or a BFD RS set associated with time/frequency tracking. Additionally, or alternatively, the configuration information may indicate that the NBI RS set or the BFD RS set are associated with time/frequency tracking (e.g., that the UE 120 should perform time/frequency tracking for the NBI RS set or the BFD RS set). In some aspects, a wireless communication specification may indicate that the UE 120 should monitor (e.g., track) time and frequency for one or more NBI RSs if the NBI RS set is configured, and the one or more NBI RSs may be considered as the set of tracked RSs.

An NBI RS set is a set of RSs that the UE 120 is configured to monitor for the purpose of new beam identification, and a BFD RS set is a set of RSs that the UE 120 is configured to monitor for beam failure determination and recovery. According to techniques described herein, the UE 120 may be configured to track a set of RSs belonging to an NBI RS set (or a BFD RS set) in time and frequency. If an activated TCI state is associated with an RS of the NBI RS set (or the BFD RS set), then the UE 120 may apply a reduced activation time, as described below.

As shown by reference number 415, the UE 120 may monitor (e.g., track) the set of RSs identified by the configuration information. As used herein, tracking the set of RSs may refer to monitoring the set of RSs such that time and frequency synchronization of the UE 120 is maintained. For example, the UE 120 may set a transmission or reception timing and/or a transmission or reception frequency using a tracked RS. The UE 120 may identify the set of RSs. For example, the UE 120 may identify the set of RSs based at least in part on the configuration information. In some aspects, upon receiving the configuration information, the UE may be mandated to monitor the set of RSs. In some aspects, the UE 120 may store information identifying the set of RSs (e.g., part or all of the configuration information described above). For example, the UE 120 may store the information identifying the set of RSs for a length of time defined by a timer. The timer may be reset upon measuring the set of RSs. In this case, an identified TCI state (as described below) may be activated within a reduced activation time based at least in part on activation signaling being received within the length of time defined by the timer. The timer may be configured by the BS 110 (e.g., via the configuration or separately from the configuration information) or may be specified in a wireless communication specification. In some aspects, the UE 120 may clean the stored information (e.g., delete the stored information, update the stored information) based at least in part on the timer. In some other aspects, the UE 120 may clean the stored information upon receiving further configuration information from the BS 110 (e.g., indicating an updated set of RSs or configuring different RSs). The timer may be measured on a per RS basis (e.g., separately for each RS of the set of RSs). For example, the UE 120 may report an RS associated with a beam1, then a timer of the RS associated with beam1 may be activated. Later, the UE 120 may report an RS associated with a beam2, and a timer of the RS associated with beam2 may be activated. In this case, the timers of beam1 and beam2 may be separate from each other. By applying the timer, the accuracy of the corresponding TCI state may be improved since measurements on the set of RSs are likely to be more recent than if no timer is used.

In some aspects, the UE 120 may store the QCL parameters and/or time/frequency tracking information for each reported/measured RS (such as each reported or measured SSB). For example, the UE 120 may store the QCL parameters and/or time/frequency tracking information for at least X ms (e.g., the length of time of the timer described elsewhere herein) after the end of transmitting a report indicating a measurement associated with an RS. As another example, the UE 120 may store QCL parameters on a first-come-first-served (e.g., first-in first-out) basis, and previously stored QCL parameters may be cleaned (e.g., deleted) if the amount of stored QCL parameters exceeds a capability of the UE 120.

In some aspects, the UE 120 may store QCL parameters for each RS (e.g., each SSB) indicated by the BS 110. For example, the BS 110 may transmit signaling indicating a group of RSs (which may be the set of RSs or may be different than the set of RSs) for which QCL parameters are to be stored (e.g., via RRC signaling, a MAC-CE, or the like). In some aspects, the number of stored SSB QCLs may be up to UE capability, as described above. The UE 120 may use the stored information to adjust a configuration to communicate via a TCI state associated with one of the group of RSs based at least in part on the stored information.

As shown by reference number 420, in some aspects, the UE 120 may optionally transmit reporting regarding an RS of the set of RSs. For example, the UE 120 may transmit information indicating a measurement associated with the RS. In some aspects, selection of a TCI state by the BS 110 (or a network node associated with the BS 110) may be based at least in part on this reporting. In some other aspects, the UE 120 may not transmit reporting regarding an RS.

As shown by reference number 425, the BS 110 may transmit, and the UE 120 may receive, activation signaling. For example, the activation signaling may include one or more MAC-CEs, which may be conveyed via a PDSCH. In some aspects, the activation signaling may include a MAC-CE activation command. As shown, the activation signaling may indicate a TCI state associated with an RS of the set of RSs. For example, the activation signaling may indicate to activate a TCI state for a PDCCH (e.g., a control resource set) or for a PDSCH. A TCI state may be considered as associated with an RS if the RS is a root QCL source of a source RS of the TCI state or a source RS of the TCI state (e.g., of a QCL relationship identified by the TCI state). In some aspects, the UE 120 may determine whether the RS is a root QCL source of a QCL RS of the TCI state or a source RS of the TCI state, and the UE 120 may accordingly use the reduced activation time or a baseline activation time, as described below.

In some aspects, the activation signaling may indicate an aperiodic channel state information reference signal (CSI-RS). For example, the RS may be an aperiodic CSI-RS that is triggered by the activation signaling identifying the TCI state. The UE 120 may perform time/frequency tracking for the aperiodic CSI-RS. For example, the UE 120 may perform time-frequency tracking for the aperiodic CSI-RS prior to receiving an SSB. Thus, the UE 120 does not need to wait for an SSB to perform time/frequency tracking.

As shown by reference number 430, the UE 120 may activate the TCI state within a reduced activation time. For example, the UE 120 may determine that the TCI state is associated with an RS of the set of RSs as described above. In some aspects, the UE 120 may use the configuration information to configure reception using the TCI state such that the activation time is reduced. For example, the UE 120 may configure a receive chain (e.g., one or more components of a radio frequency chain, one or more components of FIG. 2) to use QCL parameters determined based at least in part on tracking the RS associated with the activated TCI state. In some aspects, the UE 120 may activate the TCI state only after receiving DCI indicating that the TCI state is to be used to receive a channel (e.g., a PDSCH). In some aspects, the reduced activation time may be determined as $n+T_{HARQ}+3N_{slot}^{subframe,\mu}$. Thus, latency of TCI state activation is reduced by way of tracking the set of RSs.

In some aspects, the UE 120 may use the reduced activation time based at least in part on a threshold length of time. For example, in some aspects, the reduced activation time may be applied only if the associated RS was most recently received within X ms of the activation signaling (e.g., the identified TCI state is activated within the reduced activation time after the activation signaling is received based at least in part on the RS being received within a threshold length of time of the activation signaling). The threshold length of time (X) may be indicated by the BS 110, or may be defined in a wireless communication specification. Thus, the UE 120 may avoid using stale time/frequency tracking information, thereby improving accuracy of beamforming and increasing throughput.

In some aspects, the reduced activation time for an RS may be applied only if the latest reported measurement (e.g., L1-RSRP) of the RS is within X ms before the end of an ACK for the activation signaling (e.g., the MAC-CE) and exceeds a minimum threshold (e.g., corresponding SNR≥−3 dB, a threshold for RSRP). For example, the UE may reset the timer upon measuring the set of RSs or upon transmitting a report regarding the set of RSs (e.g., a measurement report). The UE may activate the identified TCI state within the reduced activation time based at least in part on an acknowledgment to the activating signaling being sent within the length of time defined by the timer, and based at least in part on a measurement of the set of RSs satisfying a threshold. Thus, in some aspects, the reduced activation time is applied only if the RSRP (or SNR) of the associated RS is reported X ms before the end of ACK for the activation signaling, and the RSRP (or SNR) is higher than a threshold. In some aspects, the threshold may be configured by a base station (e.g., the BS 110).

As shown by reference number 435, the UE 120 and the BS 110 may communicate using the activated TCI state. For example, the UE 120 may receive a PDCCH on a control resource set associated with the activated TCI state. As another example, the UE 120 may receive a PDSCH using the activated TCI state (e.g., based at least in part on receiving DCI indicating to use the activated TCI state to receive the PDSCH).

As indicated above, FIG. 4 is provided as an example. Other examples may differ from what is described with regard to FIG. 4. For example, the set of RSs may be determined by the UE 120 and signaled to the BS 110, as described with regard to FIG. 5.

Figure 5:
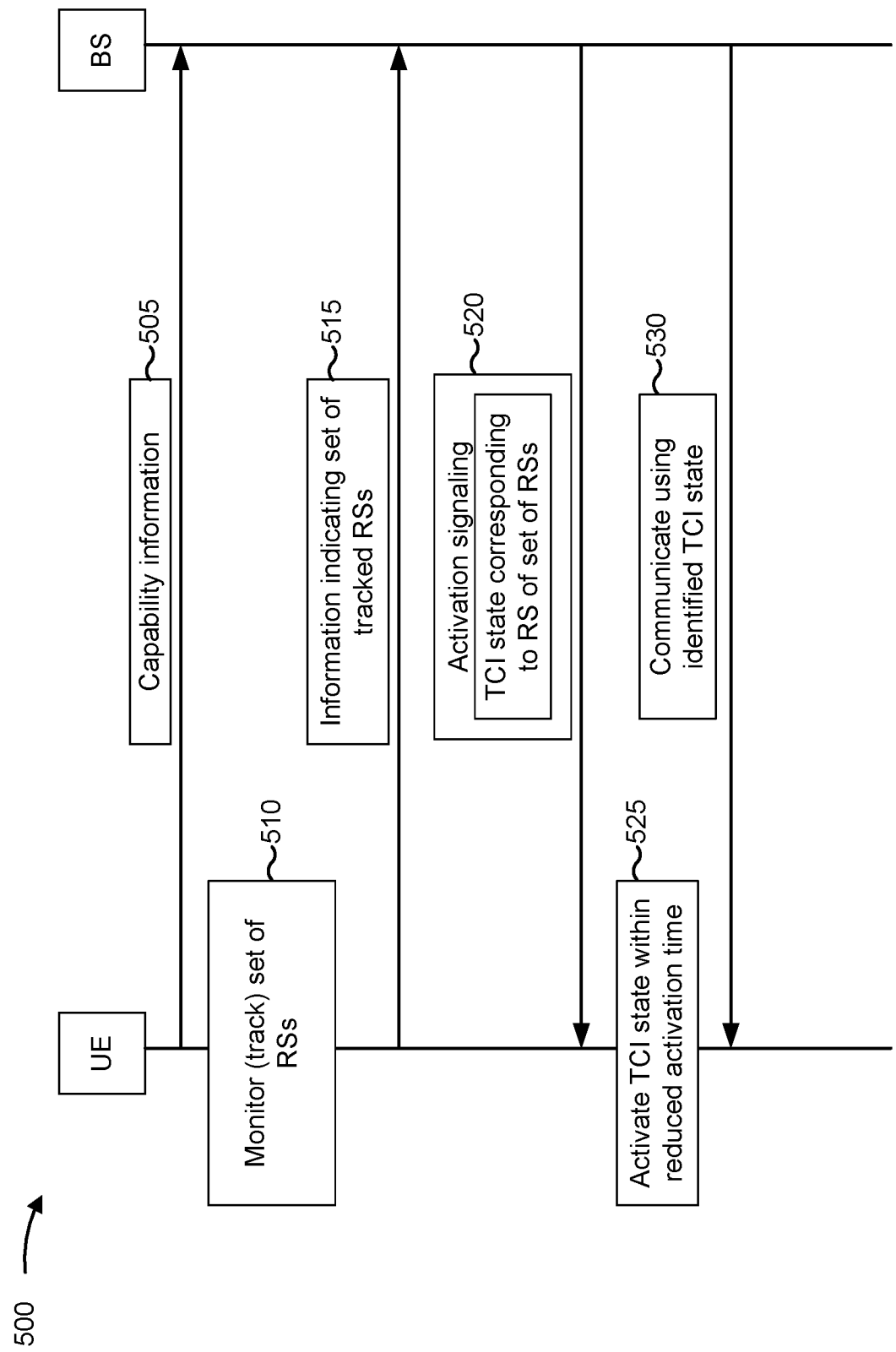

FIG. 5 is a diagram illustrating an example 500 associated with activating a TCI state in accordance with a reduced activation time, in accordance with the present disclosure. As shown, example 500 includes a UE 120 and a BS 110. In example 500, the set of RSs is determined by the UE 120 and information indicating the set of RSs is transmitted to the BS 110. In some aspects, the BS 110 may include or be associated with one or more network nodes of a disaggregated base station. For example, the BS 110 may include an RU, which may perform radio communications with the UE 120. In some aspects, the BS 110 may transmit or receive communications based on interactions with another network node, such as a DU or a CU.

As shown by reference number 505, the UE 120 may transmit, and the BS 110 may receive, capability information. The capability information may indicate one or more capabilities of the UE 120. In some aspects, the capability information may indicate whether the UE 120 supports the usage of the set of tracked RSs for MAC based beam updating. In some aspects, the capability information may indicate a maximum number of RSs that the UE 120 can support in a set of tracked RSs (e.g., a number of RSs that can be included in the set of RSs). In some aspects, the UE 120 may transmit the capability information via RRC signaling. In some aspects, the UE 120 may select a set of RSs based at least in part on this capability information. For example, the UE 120 may select up to the maximum number of RSs. In some aspects, the UE 120 may select the set of RSs based at least in part on a capability of the UE 120, and the UE 120 may not transmit information indicating the capability of the UE 120. For example, the UE 120 may select up to the maximum number of RSs without transmitting capability information. In some aspects, the capability information may indicate a number of stored quasi co-location (QCL) parameters of one or more reference signals (e.g., a number of stored SSB QCLs). For example, the number of stored SSB QCLs may be up to UE capability. The BS 110 may configure or signal a number of stored SSB QCLs in accordance with the capability information. In some aspects, the BS 110 may provide the capability information to another network node, which may generate and/or transmit configuration to the UE 120 based at least in part on the capability information.

In some aspects, the BS 110 (or a network node other than the BS 110) may transmit configuration information to the UE 120 (not shown). For example, the BS 110 may transmit the configuration information via RRC signaling, MAC signaling, DCI, or a combination thereof. In some aspects, the configuration information may indicate a plurality of TCI states corresponding to a plurality of RSs (e.g., where the plurality of RSs are root QCL sources for the plurality of TCI states or source RSs of the plurality of TCI states). An RS can itself be defined by reference to another RS (i.e., the other RS is the source RS of the RS). Thus, a chain of RSs can be defined. The root QCL source of a TCI state is the RS that is the source RS of the TCI state, or the ultimate source RS of a chain of RSs. The plurality of TCI states may initially be deactivated. In some aspects, the UE 120 may identify a set of RSs from the plurality of RSs (corresponding to the plurality of TCI states), as described below. In some aspects, a network node may configure the BS 110 and/or a DU associated with the BS 110 based at least in part on the configuration information, such that information associated with the plurality of TCI states is configured at both the UE 120 and the BS 110 or the DU.

In some aspects, the configuration information may include information associated with the plurality of TCI states. For example, the configuration information may identify time synchronization information (e.g., information indicating a time associated with the set of RSs so that the UE 120 can track an RS in time), frequency synchronization information (e.g., information indicating a frequency associated with an RS so that the UE 120 can track the RS in frequency), power delay profile information (e.g., information indicating a delay spread corresponding to a channel of an RS), spatial filter information (e.g., information indicating a filter to receive a beam that carries an RS), or the like. An RS corresponding to a configured TCI state may include, for example, one or more SSBs, one or more semi-persistent CSI-RSs, one or more periodic CSI-RSs, or the like.

As shown by reference number 510, the UE 120 may monitor (e.g., track) a set of RSs identified by the configuration information. In some aspects, the UE 120 may identify the set of RSs (e.g., prior to monitoring the set of RSs). For example, the UE 120 may select the set of RSs, for example, based at least in part on a discontinuous reception cycle of the UE 120 (e.g., the UE 120 may not measure CSI-RS outside of an active time of the UE 120), measurements regarding the set of RSs (e.g., reference signal received power or another measurement), or the like. In some aspects, the UE 120 may store the information identifying the set of RSs for a length of time defined by a timer. The timer may be reset upon measuring the set of RSs. In this case, an identified TCI state (as described below) may be activated within a reduced activation time based at least in part on activation signaling being received within the length of time defined by the timer. The timer may be configured by the BS 110 or another network node (e.g., via configuration information) or may be specified in a wireless communication specification. In some aspects, the UE 120 may clean the stored information (e.g., delete the stored information, update the stored information) based at least in part on the timer. In some other aspects, the UE 120 may clean the stored information upon receiving configuration information from the BS 110 (e.g., indicating an updated set of RSs or configuring different RSs). The timer may be measured on a per RS basis (e.g., separately for each RS of the set of RSs). For example, the UE 120 may report an RS associated with a beam1, then a timer of the RS associated with beam1 may be activated. Later, the UE 120 may report an RS associated with a beam2, and a timer of the RS associated with beam2 may be activated. In this case, the timers of beam1 and beam2 may be separate from each other. By applying the timer, the accuracy of the corresponding TCI state may be improved since measurements on the set of RSs are likely to be more recent than if no timer is used.

In some aspects, the UE 120 may store the QCL parameters and/or time/frequency tracking information for each reported/measured RS (such as each reported or measured SSB). For example, the UE 120 may store the QCL parameters and/or time/frequency tracking information for at least X ms (e.g., the length of time of the timer described elsewhere herein) after the end of transmitting a report indicating a measurement associated with an RS. As another example, the UE 120 may store QCL parameters on a first-come-first-served (e.g., first-in first-out) basis, and previously stored QCL parameters may be cleaned (e.g., deleted) if the amount of stored QCL parameters exceeds a capability of the UE 120.

In some aspects, the UE 120 may store QCL parameters for each RS (e.g., each SSB) indicated by the BS 110. For example, the BS 110 or another network node may transmit signaling indicating a group of RSs (which may be the set of RSs or may be different than the set of RSs) for which QCL parameters are to be stored (e.g., via RRC signaling, a MAC-CE, or the like). In some aspects, the number of stored SSB QCLs may be up to UE capability, as described above. The UE 120 may use the stored information to adjust a configuration to communicate via a TCI state associated with one of the group of RSs based at least in part on the stored information.

As shown by reference number 515, the UE 120 may transmit information indicating the set of RSs (e.g., to the BS 110). For example, the UE 120 may transmit the information indicating the set of tracked RSs via a CSI report or a beam management report. As another example, the UE 120 may transmit the information indicating the set of RSs via a dedicated report. The information indicating the set of RSs may indicate a set of RS indexes (e.g., SSB indexes, CSI-RS indexes, or TCI state identifiers of one or more TCI states corresponding to the set of RSs) identifying the set of RSs.

In some aspects, the transmission of the information indicating the set of RSs may be triggered by the BS 110. For example, the BS 110 may transmit, and the UE 120 may receive (not shown), a trigger for transmitting the information indicating the set of RSs. In some aspects, the UE 120 may periodically transmit the information indicating the set of RSs. For example, the UE 120 may transmit a periodic report including the information indicating the set of RSs. In some aspects, the periodic report may be configured by the BS 110.

In some aspects, the set of RSs are associated with the reduced activation time for a length of time after transmission of the information indicating the set of RSs. For example, the reported set of RSs may be valid for the purpose of the reduced activation time for a period of X ms, which reduces the likelihood of stale tracking information being used for TCI state activation. In this case, the UE 120 may track the set of RSs for the period of X ms after transmission of the information indicating the set of RSs. In some aspects, the set of RSs are associated with the reduced activation time until information indicating an updated set of RSs that does not include the set of RSs is transmitted. For example, the UE 120 may track one or more beams associated with the reported set of RSs until a further report is transmitted.

As shown by reference number 520, the BS 110 may transmit, and the UE 120 may receive, activation signaling. For example, the activation signaling may include one or more MAC-CEs, which may be conveyed via a PDSCH. In some aspects, the activation signaling may include a MAC-CE activation command. As shown, the activation signaling may indicate a TCI state associated with an RS of the set of RSs. For example, the activation signaling may indicate to activate a TCI state for a PDCCH (e.g., a control resource set) or for a PDSCH. A TCI state may be considered as associated with an RS if the RS is a root QCL source of a source RS of the TCI state or a source RS of the TCI state (e.g., of a QCL relationship identified by the TCI state). In some aspects, the UE 120 may determine whether the RS is a root QCL source of a source RS of the TCI state or a source RS of the TCI state, and may accordingly use the reduced activation time or a baseline activation time, as described below.

In some aspects, the activation signaling may indicate an aperiodic channel state information reference signal (CSI-RS). For example, the RS may be an aperiodic CSI-RS that is triggered by the activation signaling identifying the TCI state. The UE 120 may perform time/frequency tracking for the aperiodic CSI-RS. For example, the UE 120 may perform time-frequency tracking for the aperiodic CSI-RS prior to receiving an SSB. Thus, the UE 120 does not need to wait for an SSB to perform time/frequency tracking.

As shown by reference number 525, the UE 120 may activate the TCI state within a reduced activation time. For example, the UE 120 may determine that the TCI state is associated with an RS of the set of RSs as described above. In some aspects, the UE 120 may use configuration information to configure reception using the TCI state such that the activation time is reduced. For example, the UE 120 may configure a receive chain (e.g., one or more components of a radio frequency chain, one or more components of FIG. 2) to use QCL parameters determined based at least in part on tracking the RS associated with the activated TCI state. In some aspects, the UE 120 may activate the TCI state after receiving DCI indicating that the TCI state is to be used to receive a channel (e.g., a PDSCH). In some aspects, the reduced activation time may be determined as $n+T_{HARQ}+3N_{slot}^{subframe,\mu}$. Thus, latency of TCI state activation is reduced by way of tracking the set of RSs.

In some aspects, the UE 120 may use the reduced activation time based at least in part on a threshold length of time. For example, in some aspects, the reduced activation time may be applied only if the associated RS was most recently received within X ms of the activation signaling (e.g., the identified TCI state is activated within the reduced activation time after the activation signaling is received based at least in part on the RS being received within a threshold length of time of the activation signaling). The threshold length of time (X) may be indicated by the BS 110 (or a network node other than the BS 110), or may be defined in a wireless communication specification. Thus, the UE 120 may avoid using stale time/frequency tracking information, thereby improving accuracy of beamforming and increasing throughput.

In some aspects, the reduced activation time for an RS may be applied only if the latest reported measurement (e.g., L1-RSRP) of the RS is within X ms before the end of an ACK for the activation signaling (e.g., the MAC-CE) and exceeds a minimum threshold (e.g., corresponding SNR≥−3 dB, a threshold for RSRP). For example, the UE may reset the timer upon measuring the set of RSs or upon transmitting a report regarding the set of RSs (e.g., a measurement report). The UE may activate the identified TCI state within the reduced activation time based at least in part on an acknowledgment to the activating signaling being sent within the length of time defined by the timer, and based at least in part on a measurement of the set of RSs satisfying a threshold. Thus, in some aspects, the reduced activation time is applied only if the RSRP (or SNR) of the associated RS is reported X ms before the end of ACK for the activation signaling, and the RSRP (or SNR) is higher than a threshold. In some aspects, the threshold may be configured by a network node (e.g., the BS 110 or another network node).

As shown by reference number 530, the UE 120 and the BS 110 may communicate using the activated TCI state. For example, the BS 110 may transmit, and the UE 120 may receive, a PDCCH on a control resource set associated with the activated TCI state. As another example, the BS 110 may transmit, and the UE 120 may receive, a PDSCH using the activated TCI state (e.g., based at least in part on receiving DCI indicating to use the activated TCI state to receive the PDSCH).

As indicated above, FIG. 5 is provided as an example. Other examples may differ from what is described with regard to FIG. 5. For example, the set of RSs may be signaled to the UE 120, as described with regard to FIG. 4.

Figure 6:
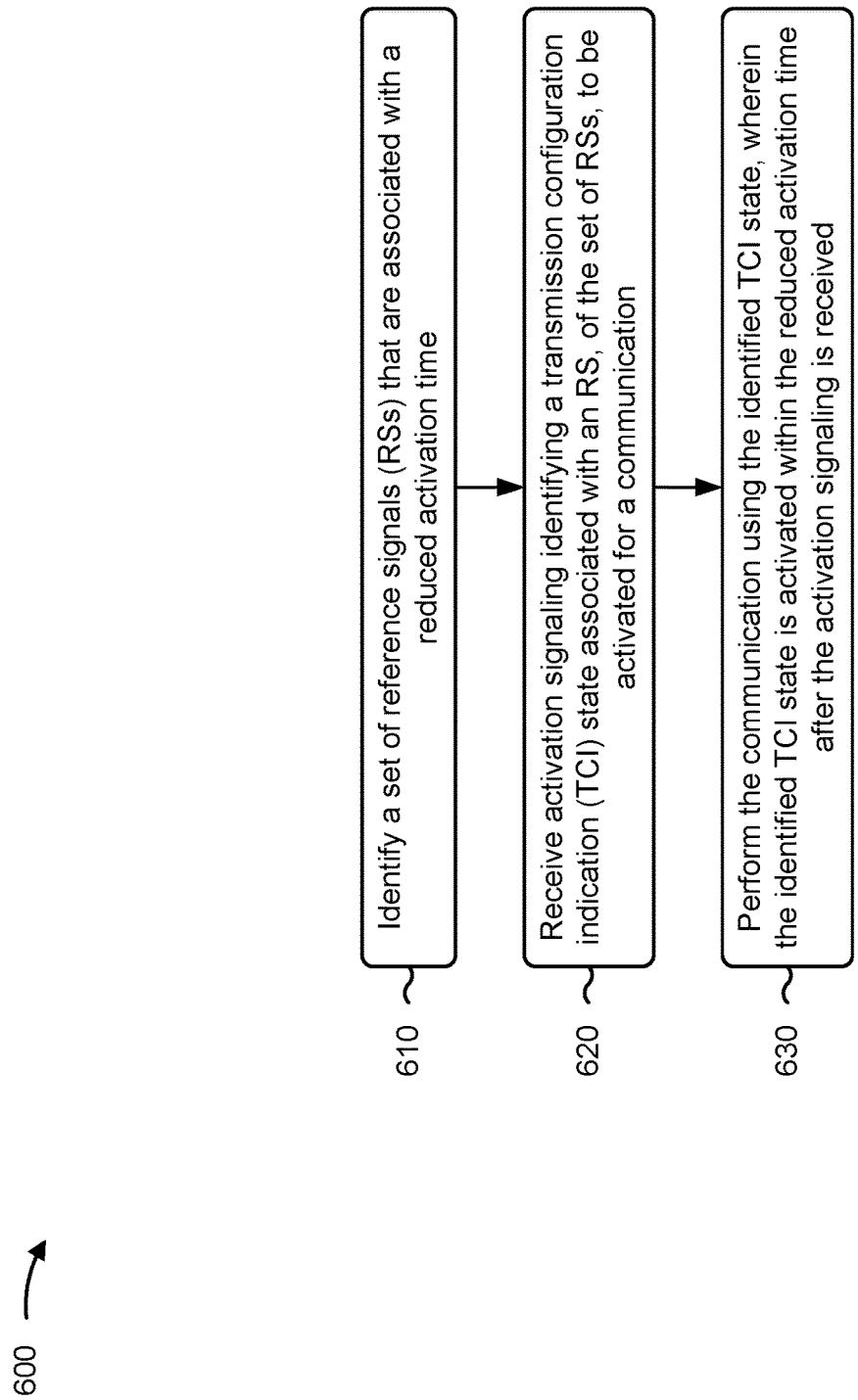
FIGS. 6-7 are diagrams illustrating example processes associated with activating a TCI state in accordance with a reduced activation time, in accordance with the present disclosure.

FIG. 6 is a diagram illustrating an example process 600 performed, for example, by a UE, in accordance with the present disclosure. Example process 600 is an example where an apparatus of the UE (e.g., UE 120, one or more components of FIG. 2) performs operations associated with a low latency beam update.

As shown in FIG. 6, in some aspects, process 600 may include identifying a set of RSs that are associated with a reduced activation time (block 610). For example, the UE (e.g., using communication manager 140 and/or identification component 808, depicted in FIG. 8) may identify a set of RSs that are associated with a reduced activation time, as described above.

As further shown in FIG. 6, in some aspects, process 600 may include receiving activation signaling identifying a TCI state associated with an RS, of the set of RSs, to be activated for a communication (block 620). For example, the UE (e.g., using communication manager 140 and/or reception component 802, depicted in FIG. 8) may receive activation signaling identifying a TCI state associated with an RS, of the set of RSs, to be activated for a communication, as described above.

As further shown in FIG. 6, in some aspects, process 600 may include performing the communication using the identified TCI state, wherein the identified TCI state is activated within the reduced activation time after the activation signaling is received (block 630). For example, the UE (e.g., using communication manager 140 and/or beamforming component 810, depicted in FIG. 8) may perform the communication using the identified TCI state, wherein the identified TCI state is activated within the reduced activation time after the activation signaling is received, as described above.

Process 600 may include additional aspects, such as any single aspect or any combination of aspects described below and/or in connection with one or more other processes described elsewhere herein.

In a first aspect, process 600 includes performing time and frequency tracking for the set of RSs.

In a second aspect, alone or in combination with the first aspect, the reduced activation time is based at least in part on ignoring a time until a next synchronization signal block is received.

In a third aspect, alone or in combination with one or more of the first and second aspects, identifying the set of RSs further comprises receiving configuration information indicating the set of RSs.

In a fourth aspect, alone or in combination with one or more of the first through third aspects, the configuration information indicates that the set of RSs belong to a NBI RS set or a BFD RS set associated with time and frequency tracking.

In a fifth aspect, alone or in combination with one or more of the first through fourth aspects, the configuration information indicates that the NBI RS set or the BFD RS set is associated with time and frequency tracking.

In a sixth aspect, alone or in combination with one or more of the first through fifth aspects, the configuration information indicates a set of RS indexes identifying the set of RSs.

In a seventh aspect, alone or in combination with one or more of the first through sixth aspects, the configuration information indicates at least one of time synchronization information, synchronization information, power delay profile information, or spatial filter information.

In an eighth aspect, alone or in combination with one or more of the first through seventh aspects, process 600 includes activating the identified TCI state in accordance with the configuration information.

In a ninth aspect, alone or in combination with one or more of the first through eighth aspects, the set of RSs includes at least one of a synchronization signal block, a semi-persistent CSI-RS, or a periodic CSI-RS.

In a tenth aspect, alone or in combination with one or more of the first through ninth aspects, the identified TCI state is activated within the reduced activation time after the activation signaling is received based at least in part on the RS associated with the identified TCI state being a root QCL source of a source RS of the identified TCI state or a source RS of the identified TCI state.

In an eleventh aspect, alone or in combination with one or more of the first through tenth aspects, the identified TCI state is activated within the reduced activation time after the activation signaling is received based at least in part on the RS being received within a threshold length of time of the activation signaling.

In a twelfth aspect, alone or in combination with one or more of the first through eleventh aspects, process 600 includes transmitting information indicating the set of RSs to a base station.

In a thirteenth aspect, alone or in combination with one or more of the first through twelfth aspects, the information indicating the set of RSs is transmitted in at least one of a channel state information report, a beam management report, or a dedicated report.

In a fourteenth aspect, alone or in combination with one or more of the first through thirteenth aspects, the information indicating the set of RSs indicates a set of RS indexes identifying the set of RSs.

In a fifteenth aspect, alone or in combination with one or more of the first through fourteenth aspects, process 600 includes receiving a trigger for transmitting the information indicating the set of RSs.

In a sixteenth aspect, alone or in combination with one or more of the first through fifteenth aspects, transmitting the information indicating the set of RSs further comprises periodically transmitting the information indicating the set of RSs based at least in part on a configuration.

In a seventeenth aspect, alone or in combination with one or more of the first through sixteenth aspects, the set of RSs are associated with the reduced activation time for a length of time after transmission of the information indicating the set of RSs.

In an eighteenth aspect, alone or in combination with one or more of the first through seventeenth aspects, the set of RSs are associated with the reduced activation time until information indicating an updated set of RSs that does not include the set of RSs is transmitted.

In a nineteenth aspect, alone or in combination with one or more of the first through eighteenth aspects, process 600 includes transmitting capability information indicating a number of RSs that can be included in the set of RSs or a number of stored quasi co-location parameters of one or more reference signals, wherein the set of RSs is based at least in part on the capability information.

In a twentieth aspect, alone or in combination with one or more of the first through nineteenth aspects, process 600 includes storing information identifying the set of RSs for a length of time defined by a timer, wherein the timer is reset upon measuring the set of RSs or upon transmitting a report regarding the set of RSs.

In a twenty-first aspect, alone or in combination with one or more of the first through twentieth aspects, the identified TCI state is activated within the reduced activation time based at least in part on the activation signaling being received or an acknowledgement to the activation signaling being sent within the length of time defined by the timer.

In a twenty-second aspect, alone or in combination with one or more of the first through twenty-first aspects, the identified TCI state is activated within the reduced activation time based at least in part on a measurement of the set of RSs satisfying a threshold configured by a base station.

In a twenty-third aspect, alone or in combination with one or more of the first through twenty-second aspects, the length of time is measured on a per RS basis.

In a twenty-fourth aspect, alone or in combination with one or more of the first through twenty-third aspects, the RS is an aperiodic channel state information reference signal that is triggered by the activation signaling identifying the TCI state, and the process 600 further comprises performing time and frequency tracking for the RS prior to receive a synchronization signal block.

In a twenty-fifth aspect, alone or in combination with one or more of the first through twenty-fourth aspects, the process 600 further includes storing information identifying the set of RSs on a first-in first-out basis.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
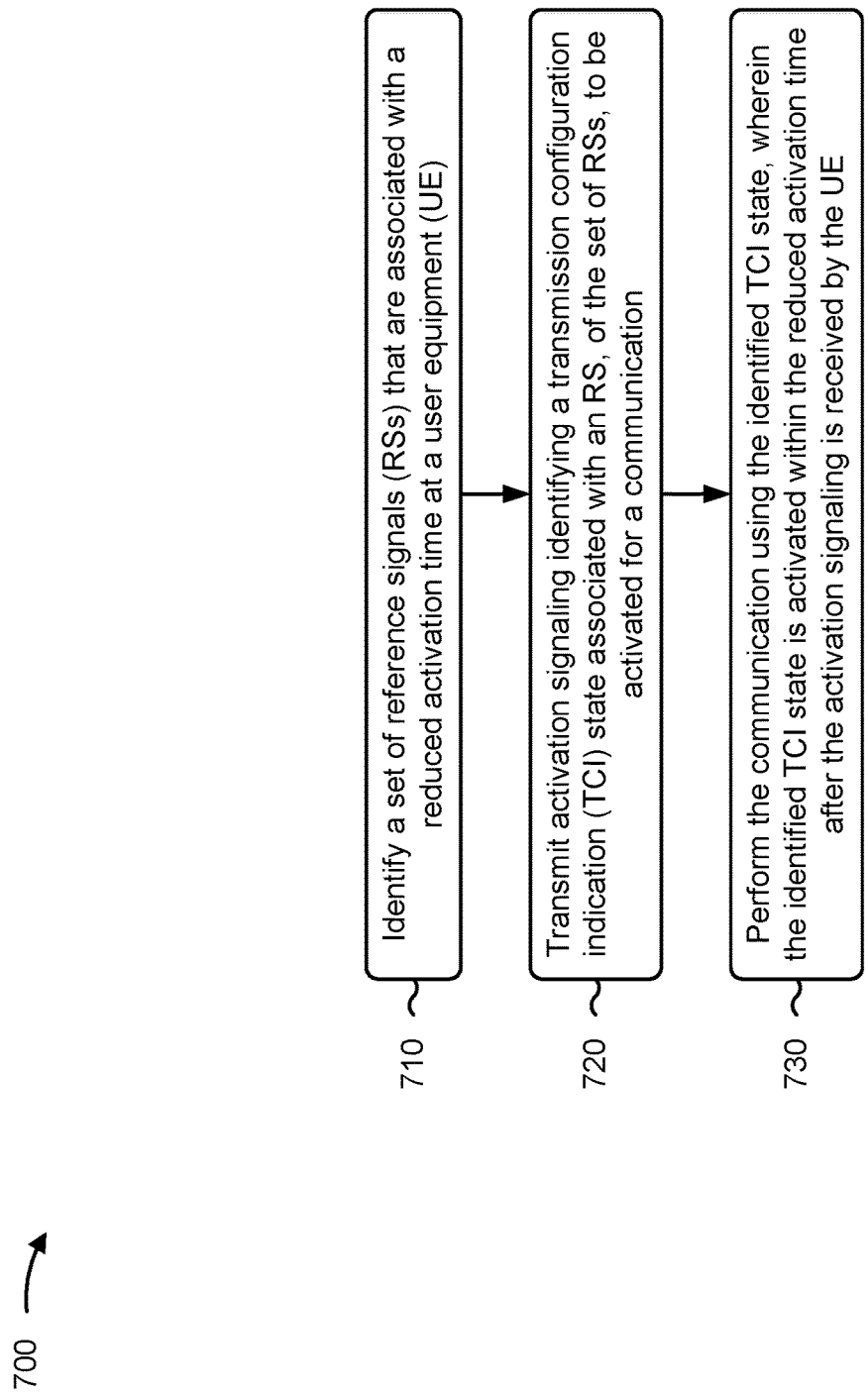

FIG. 7 is a diagram illustrating an example process 700 performed, for example, by a base station, in accordance with the present disclosure. Example process 700 is an example where an apparatus of a base station (e.g., base station 110, a network node) performs operations associated with a low latency beam update.

As shown in FIG. 7, in some aspects, process 700 may include identifying a set of RSs that are associated with a reduced activation time at a UE (block 710). For example, the base station (e.g., using communication manager 150 and/or identification component 908, depicted in FIG. 9) may identify a set of RSs that are associated with a reduced activation time at a UE, as described above.

As further shown in FIG. 7, in some aspects, process 700 may include transmitting activation signaling identifying a TCI state associated with an RS, of the set of RSs, to be activated for a communication (block 720). For example, the base station (e.g., using communication manager 150 and/or transmission component 904, depicted in FIG. 9) may transmit activation signaling identifying a TCI state associated with an RS, of the set of RSs, to be activated for a communication, as described above.

As further shown in FIG. 7, in some aspects, process 700 may include performing the communication using the identified TCI state, wherein the identified TCI state is activated within the reduced activation time after the activation signaling is received by the UE (block 730). For example, the base station (e.g., using communication manager 150 and/or beamforming component 910, depicted in FIG. 9) may perform the communication based at least in part on the identified TCI state, wherein the identified TCI state is activated within the reduced activation time after the activation signaling is received by the UE, as described above.

Process 700 may include additional aspects, such as any single aspect or any combination of aspects described below and/or in connection with one or more other processes described elsewhere herein.

In a first aspect, the reduced activation time is based at least in part on ignoring a time until a next synchronization signal block is transmitted.

In a second aspect, alone or in combination with the first aspect, identifying the set of RSs further comprises transmitting or receiving configuration information indicating the set of RSs.

In a third aspect, alone or in combination with one or more of the first and second aspects, the configuration information indicates that the set of RSs belong to an NBI RS set or a BFD RS set associated with time and frequency tracking.

In a fourth aspect, alone or in combination with one or more of the first through third aspects, the configuration information indicates that the NBI RS set or the BFD RS set is associated with time and frequency tracking.

In a fifth aspect, alone or in combination with one or more of the first through fourth aspects, the configuration information indicates a set of RS indexes identifying the set of RSs.

In a sixth aspect, alone or in combination with one or more of the first through fifth aspects, the configuration information indicates at least one of time synchronization information, synchronization information, power delay profile information, or spatial filter information.

In a seventh aspect, alone or in combination with one or more of the first through sixth aspects, the set of RSs includes at least one of a synchronization signal block, a semi-persistent CSI-RS, or a periodic CSI-RS.

In an eighth aspect, alone or in combination with one or more of the first through seventh aspects, the identified TCI state is activated within the reduced activation time after the activation signaling is received based at least in part on the RS associated with the identified TCI state being a root QCL source of a source RS of the identified TCI state or a source RS of the identified TCI state.

In a ninth aspect, alone or in combination with one or more of the first through eighth aspects, the identified TCI state is activated within the reduced activation time after the activation signaling is received based at least in part on the RS being received within a threshold length of time of the activation signaling.

In a tenth aspect, alone or in combination with one or more of the first through ninth aspects, process 700 includes receiving information indicating the set of RSs.

In an eleventh aspect, alone or in combination with one or more of the first through tenth aspects, the information indicating the set of RSs is received in at least one of a channel state information report, a beam management report, or a dedicated report.

In a twelfth aspect, alone or in combination with one or more of the first through eleventh aspects, the information indicating the set of RSs indicates a set of RS indexes identifying the set of RSs.

In a thirteenth aspect, alone or in combination with one or more of the first through twelfth aspects, process 700 includes transmitting a trigger for transmitting the information indicating the set of RSs.

In a fourteenth aspect, alone or in combination with one or more of the first through thirteenth aspects, process 700 includes transmitting or receiving a configuration for periodic transmission of the information indicating the set of RSs, and periodically receiving the information indicating the set of RSs in accordance with the configuration.

In a fifteenth aspect, alone or in combination with one or more of the first through fourteenth aspects, the set of RSs are associated with the reduced activation time for a length of time after transmission of the information indicating the set of RSs.

In a sixteenth aspect, alone or in combination with one or more of the first through fifteenth aspects, the set of RSs are associated with the reduced activation time until information indicating an updated set of RSs that does not include the set of RSs is transmitted.

In a seventeenth aspect, alone or in combination with one or more of the first through sixteenth aspects, process 700 includes receiving capability information indicating a number of RSs that can be included in the set of RSs or a number of stored quasi co-location parameters of one or more reference signals, wherein the set of RSs is based at least in part on the capability information.

In an eighteenth aspect, alone or in combination with one or more of the first through seventeenth aspects, the RS is an aperiodic channel state information reference signal that is triggered by the activation signaling identifying the TCI state.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
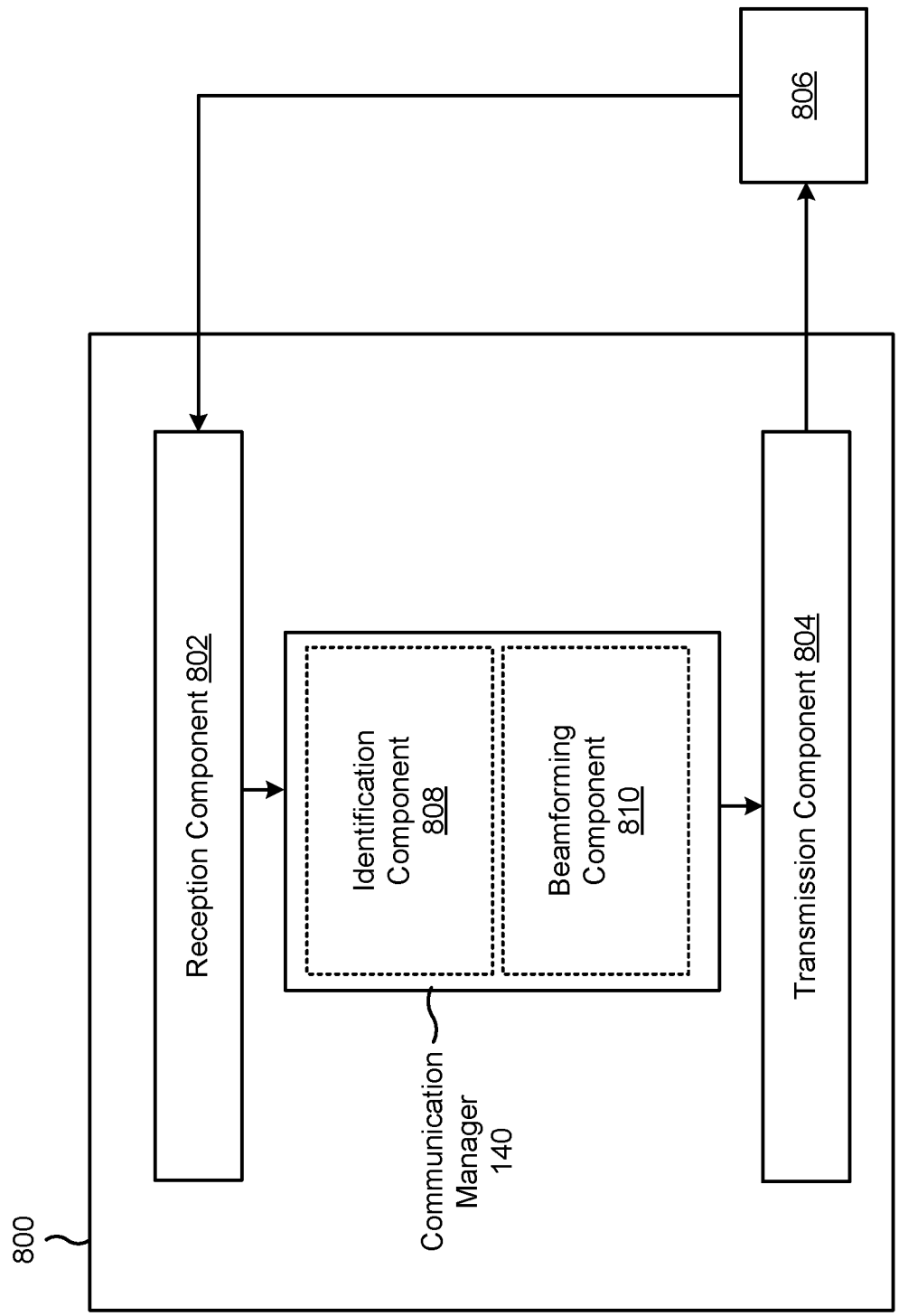
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of an identification component 808 or a beamforming component 810, among other examples.

In some aspects, the apparatus 800 may be configured to perform one or more operations described herein in connection with FIGS. 3-9. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The identification component 808 may identify a set of RSs that are associated with a reduced activation time. The reception component 802 may receive activation signaling identifying a TCI state associated with an RS, of the set of RSs, to be activated for a communication. The beamforming component 810 or the reception component 802 may perform the communication using the identified TCI state, wherein the identified TCI state is activated within the reduced activation time after the activation signaling is received.

The reception component 802 may perform time and frequency tracking for the set of RSs.

The beamforming component 810 may activate the identified TCI state in accordance with the configuration information.

The transmission component 804 may transmit information indicating the set of RSs to a base station.

The reception component 802 may receive a trigger for transmitting the information indicating the set of RSs.

The transmission component 804 may transmit capability information indicating a number of RSs that can be included in the set of RSs, wherein the set of RSs is based at least in part on the capability information.

The beamforming component 810 may store information identifying the set of RSs for a length of time defined by a timer, wherein the timer is reset upon measuring the set of RSs.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
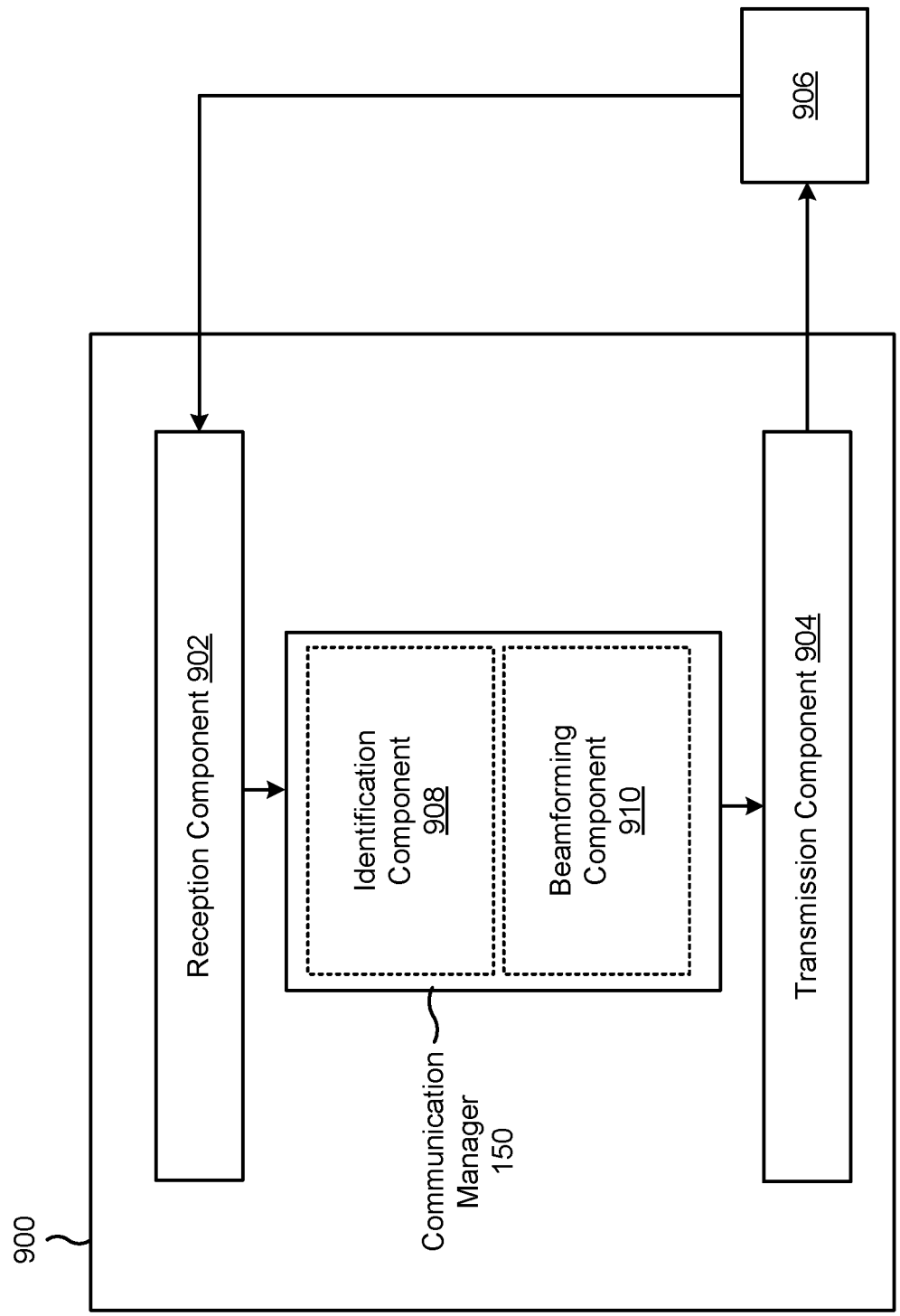

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of an identification component 908 or a beamforming component 910, among other examples.

In some aspects, the apparatus 900 may be configured to perform one or more operations described herein in connection with FIGS. 3-9. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver. In some aspects, the transmission component 904 and/or the reception component 902 may be co-located in a network interface, which may communicate with network nodes via a communication link, such as a backhaul link, a fronthaul link, or a midhaul link.

The identification component 908 may identify a set of RSs that are associated with a reduced activation time at a UE. The transmission component 904 may transmit activation signaling identifying a TCI state associated with an RS, of the set of RSs, to be activated for a communication. The beamforming component 910 may perform the communication using the identified TCI state, wherein the identified TCI state is activated within the reduced activation time after the activation signaling is received by the UE.

The reception component 902 may receive information indicating the set of RSs.

The transmission component 904 may transmit a trigger for transmitting the information indicating the set of RSs.

The transmission component 904 may transmit a configuration for periodic transmission of the information indicating the set of RSs.

The reception component 902 may periodically receive the information indicating the set of RSs in accordance with the configuration.

The reception component 902 may receive capability information indicating a number of RSs that can be included in the set of RSs, wherein the set of RSs is based at least in part on the capability information.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: identifying a set of reference signals (RSs) that are associated with a reduced activation time; receiving activation signaling identifying a transmission configuration indicator (TCI) state associated with an RS, of the set of RSs, to be activated for a communication; and performing the communication using the identified TCI state, wherein the identified TCI state is activated within the reduced activation time after the activation signaling is received.

Aspect 2: The method of Aspect 1, further comprising: performing time and frequency tracking for the set of RSs.

Aspect 3: The method of any one of Aspects 1 through 2, wherein the reduced activation time is based at least in part on ignoring a time until a next synchronization signal block is received.

Aspect 4: The method of any one of Aspects 1 through 3, wherein identifying the set of RSs further comprises: receiving configuration information indicating the set of RSs.

Aspect 5: The method of Aspect 4, wherein the configuration information indicates that the set of RSs belong to a new beam identification (NBI) RS set or a beam failure determination (BFD) RS set associated with time and frequency tracking.

Aspect 6: The method of Aspect 5, wherein the configuration information indicates that the NBI RS set or the BFD RS set is associated with time and frequency tracking.

Aspect 7: The method of Aspect 4, wherein the configuration information indicates a set of RS indexes identifying the set of RSs.

Aspect 8: The method of Aspect 4, wherein the configuration information indicates at least one of: time synchronization information, frequency synchronization information, power delay profile information, or spatial filter information.

Aspect 9: The method of Aspect 4, further comprising: activating the identified TCI state in accordance with the configuration information.

Aspect 10: The method of any one of Aspects 1 through 9, wherein the set of RSs includes at least one of: a synchronization signal block, a semi-persistent channel state information reference signal (CSI-RS), or a periodic CSI-RS.

Aspect 11: The method of any one of Aspects 1 through 10, wherein the identified TCI state is activated within the reduced activation time after the activation signaling is received based at least in part on the RS associated with the identified TCI state being a root quasi co-location (QCL) source of a source RS of the identified TCI state or a source RS of the identified TCI state.

Aspect 12: The method of any one of Aspects 1 through 11, wherein the identified TCI state is activated within the reduced activation time after the activation signaling is received based at least in part on the RS being received within a threshold length of time of the activation signaling.

Aspect 13: The method of any one of Aspects 1 through 12, further comprising: transmitting information indicating the set of RSs to a base station.

Aspect 14: The method of Aspect 13, wherein the information indicating the set of RSs is transmitted in at least one of: a channel state information report, a beam management report, or a dedicated report.

Aspect 15: The method of Aspect 13, wherein the information indicating the set of RSs indicates a set of RS indexes identifying the set of RSs.

Aspect 16: The method of Aspect 13, further comprising: receiving a trigger for transmitting the information indicating the set of RSs.

Aspect 17: The method of Aspect 13, wherein transmitting the information indicating the set of RSs further comprises: periodically transmitting the information indicating the set of RSs based at least in part on a configuration.

Aspect 18: The method of Aspect 13, wherein the set of RSs are associated with the reduced activation time for a length of time after transmission of the information indicating the set of RSs.

Aspect 19: The method of Aspect 13, wherein the set of RSs are associated with the reduced activation time until information indicating an updated set of RSs that does not include the set of RSs is transmitted.

Aspect 20: The method of any one of Aspects 1 through 19, further comprising: transmitting capability information indicating a number of RSs that can be included in the set of RSs or a number of stored quasi co-location parameters of one or more reference signals, wherein the set of RSs is based at least in part on the capability information.

Aspect 21: The method of any one of Aspects 1 through 20, further comprising: storing information identifying the set of RSs for a length of time defined by a timer, wherein the timer is reset upon measuring the set of RSs or upon transmitting a report regarding the set of RSs.

Aspect 22: The method of Aspect 21, wherein the identified TCI state is activated within the reduced activation time based at least in part on the activation signaling being received or an acknowledgement to the activation signaling being sent within the length of time defined by the timer.

Aspect 23: The method of Aspect 22, wherein the identified TCI state is activated within the reduced activation time based at least in part on a measurement of the set of RSs satisfying a threshold configured by a base station.

Aspect 24: The method of Aspect 21, wherein the length of time is measured on a per RS basis.

Aspect 25: The method of any one of Aspects 1 through 24, wherein the RS is an aperiodic channel state information reference signal that is triggered by the activation signaling identifying the TCI state, wherein the method further comprises: performing time and frequency tracking for the RS prior to receive a synchronization signal block.

Aspect 26: The method of any one of Aspects 1 through 25, further comprising: storing information identifying the set of RSs on a first-in first-out basis.

Aspect 27: A method of wireless communication performed by a base station, comprising: identifying a set of reference signals (RSs) that are associated with a reduced activation time at a user equipment (UE); transmitting activation signaling identifying a transmission configuration indicator (TCI) state associated with an RS, of the set of RSs, to be activated for a communication; and performing the communication using the identified TCI state, wherein the identified TCI state is activated within the reduced activation time after the activation signaling is received by the UE.

Aspect 28: The method of Aspect 27, wherein the reduced activation time is based at least in part on ignoring a time until a next synchronization signal block is transmitted.

Aspect 29: The method of any one of Aspects 27 through 28, wherein identifying the set of RSs further comprises: transmitting configuration information indicating the set of RSs.

Aspect 30: The method of Aspect 29, wherein the configuration information indicates that the set of RSs belong to a new beam identification (NBI) RS set or a beam failure determination (BFD) RS set associated with time and frequency tracking.

Aspect 31: The method of Aspect 30, wherein the configuration information indicates that the NBI RS set or the BFD RS set is associated with time and frequency tracking.

Aspect 32: The method of Aspect 29, wherein the configuration information indicates a set of RS indexes identifying the set of RSs.

Aspect 33: The method of Aspect 29, wherein the configuration information indicates at least one of: time synchronization information, frequency synchronization information, power delay profile information, or spatial filter information.

Aspect 34: The method of any one of Aspects 27 through 33, wherein the set of RSs includes at least one of: a synchronization signal block, a semi-persistent channel state information reference signal (CSI-RS), or a periodic CSI-RS.

Aspect 35: The method of any one of Aspects 27 through 34, wherein the identified TCI state is activated within the reduced activation time after the activation signaling is received based at least in part on the RS associated with the identified TCI state being a root quasi co-location (QCL) source of a source RS of the identified TCI state or a source RS of the identified TCI state.

Aspect 36: The method of any one of Aspects 27 through 35, wherein the identified TCI state is activated within the reduced activation time after the activation signaling is received based at least in part on the RS being received within a threshold length of time of the activation signaling.

Aspect 37: The method of any one of Aspects 27 through 36, further comprising: receiving information indicating the set of RSs.

Aspect 38: The method of Aspect 37, wherein the information indicating the set of RSs is transmitted in at least one of: a channel state information report, a beam management report, or a dedicated report.

Aspect 39: The method of Aspect 37, wherein the information indicating the set of RSs indicates a set of RS indexes identifying the set of RSs.

Aspect 40: The method of Aspect 37, further comprising: transmitting a trigger for transmitting the information indicating the set of RSs.

Aspect 41: The method of Aspect 37, further comprising: transmitting a configuration for periodic transmission of the information indicating the set of RSs; and periodically receiving the information indicating the set of RSs in accordance with the configuration.

Aspect 42: The method of Aspect 37, wherein the set of RSs are associated with the reduced activation time for a length of time after transmission of the information indicating the set of RSs.

Aspect 43: The method of Aspect 37, wherein the set of RSs are associated with the reduced activation time until information indicating an updated set of RSs that does not include the set of RSs is transmitted.

Aspect 44: The method of Aspect 37, further comprising: receiving capability information indicating a number of RSs that can be included in the set of RSs or a number of stored quasi co-location parameters of one or more reference signals, wherein the set of RSs is based at least in part on the capability information.

Aspect 45: The method of any one of Aspects 27 through 44, wherein the RS is an aperiodic channel state information reference signal that is triggered by the activation signaling identifying the TCI state.

Aspect 46: An apparatus for wireless communication at a device, comprising a processor; memory coupled with the processor; and instructions stored in the memory and executable by the processor to cause the apparatus to perform the method of one or more of Aspects 1-45.

Aspect 46: A device for wireless communication, comprising a memory and one or more processors coupled to the memory, the one or more processors configured to perform the method of one or more of Aspects 1-45.

Aspect 47: An apparatus for wireless communication, comprising at least one means for performing the method of one or more of Aspects 1-45.

Aspect 48: A non-transitory computer-readable medium storing code for wireless communication, the code comprising instructions executable by a processor to perform the method of one or more of Aspects 1-45.

Aspect 49: A non-transitory computer-readable medium storing a set of instructions for wireless communication, the set of instructions comprising one or more instructions that, when executed by one or more processors of a device, cause the device to perform the method of one or more of Aspects 1-45.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
   receive activation signaling identifying a transmission configuration indicator (TCI) state associated with a reference signal (RS), of a set of reference signals (RSs) associated with a reduced activation time, to be activated for a communication; and
   perform the communication using the identified TCI state, wherein the identified TCI state is activated within the reduced activation time after the activation signaling is received based at least in part on the RS being received within a threshold length of time of the activation signaling.

2. The apparatus of claim 1, wherein the one or more processors are further configured to:
   perform time and frequency tracking for the set of RSs.

3. The apparatus of claim 1, wherein the reduced activation time is based at least in part on ignoring a time until a next synchronization signal block is received.

4. The apparatus of claim 1, wherein the one or more processors, to identify the set of RSs, are configured to:
   receive configuration information indicating the set of RSs.

5. The apparatus of claim 4, wherein the configuration information indicates that the set of RSs belong to a new beam identification (NBI) RS set or a beam failure determination (BFD) RS set associated with time and frequency tracking.

6. The apparatus of claim 5, wherein the configuration information indicates that the NBI RS set or the BFD RS set is associated with time and frequency tracking.

7. The apparatus of claim 4, wherein the configuration information indicates a set of RS indexes identifying the set of RSs.

8. The apparatus of claim 4, wherein the configuration information indicates at least one of:
   time synchronization information,
   frequency synchronization information,
   power delay profile information, or
   spatial filter information.

9. The apparatus of claim 4, wherein the one or more processors are further configured to:
   activate the identified TCI state in accordance with the configuration information.

10. The apparatus of claim 1, wherein the set of RSs includes at least one of:
    a synchronization signal block,
    a semi-persistent channel state information reference signal (CSI-RS), or
    a periodic CSI-RS.

11. The apparatus of claim 1, wherein the identified TCI state is activated within the reduced activation time after the activation signaling is received based at least in part on the RS associated with the identified TCI state being a root quasi co-location (QCL) source of a source RS of the identified TCI state or a source RS of the identified TCI state.

12. The apparatus of claim 1, wherein the one or more processors are further configured to:
    transmit information indicating the set of RSs to a base station.

13. The apparatus of claim 1, wherein the one or more processors are further configured to:
    transmit capability information indicating a number of RSs that can be included in the set of RSs or a number of stored quasi co-location parameters of one or more reference signals, wherein the set of RSs is based at least in part on the capability information.

14. The apparatus of claim 1, wherein the one or more processors are further configured to:
    store information identifying the set of RSs for a length of time defined by a timer, wherein the timer is reset upon measuring the set of RSs or upon transmitting a report regarding the set of RSs.

15. The apparatus of claim 1, wherein the RS is an aperiodic channel state information reference signal that is triggered by the activation signaling identifying the TCI state, wherein the one or more processors are further configured to:
    perform time and frequency tracking for the RS prior to receive a synchronization signal block.

16. The apparatus of claim 1, wherein the one or more processors are further configured to:
    store information identifying the set of RSs on a first-in first-out basis.

17. An apparatus for wireless communication at a base station, comprising:
    a memory; and
    one or more processors, coupled to the memory, configured to:
    transmit activation signaling identifying a transmission configuration indicator (TCI) state associated with a reference signal (RS), of a set of RSs associated with a reduced activation time at a user equipment (UE), to be activated for a communication; and
    perform the communication based at least in part on the identified TCI state, wherein the identified TCI state is activated within the reduced activation time after the activation signaling is received by the UE based at least in part on the RS being received within a threshold length of time of the activation signaling.

18. The apparatus of claim 17, wherein the reduced activation time is based at least in part on ignoring a time until a next synchronization signal block is transmitted.

19. The apparatus of claim 17, wherein the one or more processors are configured to:
transmit or receive configuration information indicating the set of RSs.

20. The apparatus of claim 19, wherein the configuration information indicates that the set of RSs belong to a new beam identification (NBI) RS set or a beam failure determination (BFD) RS set associated with time and frequency tracking.

21. The apparatus of claim 20, wherein the configuration information indicates that the NBI RS set or the BFD RS set is associated with time and frequency tracking.

22. The apparatus of claim 17, wherein the set of RSs includes at least one of:
a synchronization signal block,
a semi-persistent channel state information reference signal (CSI-RS), or
a periodic CSI-RS.

23. The apparatus of claim 17, wherein the identified TCI state is activated within the reduced activation time after the activation signaling is received based at least in part on the RS associated with the identified TCI state being a root quasi co-location (QCL) source of a source RS of the identified TCI state or a source RS of the identified TCI state.

24. The apparatus of claim 17, wherein the one or more processors are further configured to:
receive information indicating the set of RSs.

25. A method of wireless communication performed by a user equipment (UE), comprising:
receiving activation signaling identifying a transmission configuration indicator (TCI) state associated with a reference signal (RS), of a set of reference signals (RSs) associated with a reduced activation time, to be activated for a communication; and
performing the communication using the identified TCI state, wherein the identified TCI state is activated within the reduced activation time after the activation signaling is received based at least in part on the RS being received within a threshold length of time of the activation signaling.

26. The method of claim 25, further comprising:
performing time and frequency tracking for the set of RSs.

27. A method of wireless communication performed by a base station, comprising:
transmitting activation signaling identifying a transmission configuration indicator (TCI) state associated with a reference signal (RS), of a set of RSs associated with a reduced activation time at a user equipment (UE), to be activated for a communication; and
performing the communication based at least in part on the identified TCI state, wherein the identified TCI state is activated within the reduced activation time after the activation signaling is received by the UE based at least in part on the RS being received within a threshold length of time of the activation signaling.

28. The method of claim 27, wherein the reduced activation time is based at least in part on ignoring a time until a next synchronization signal block is transmitted.

* * * * *